Figure 1:
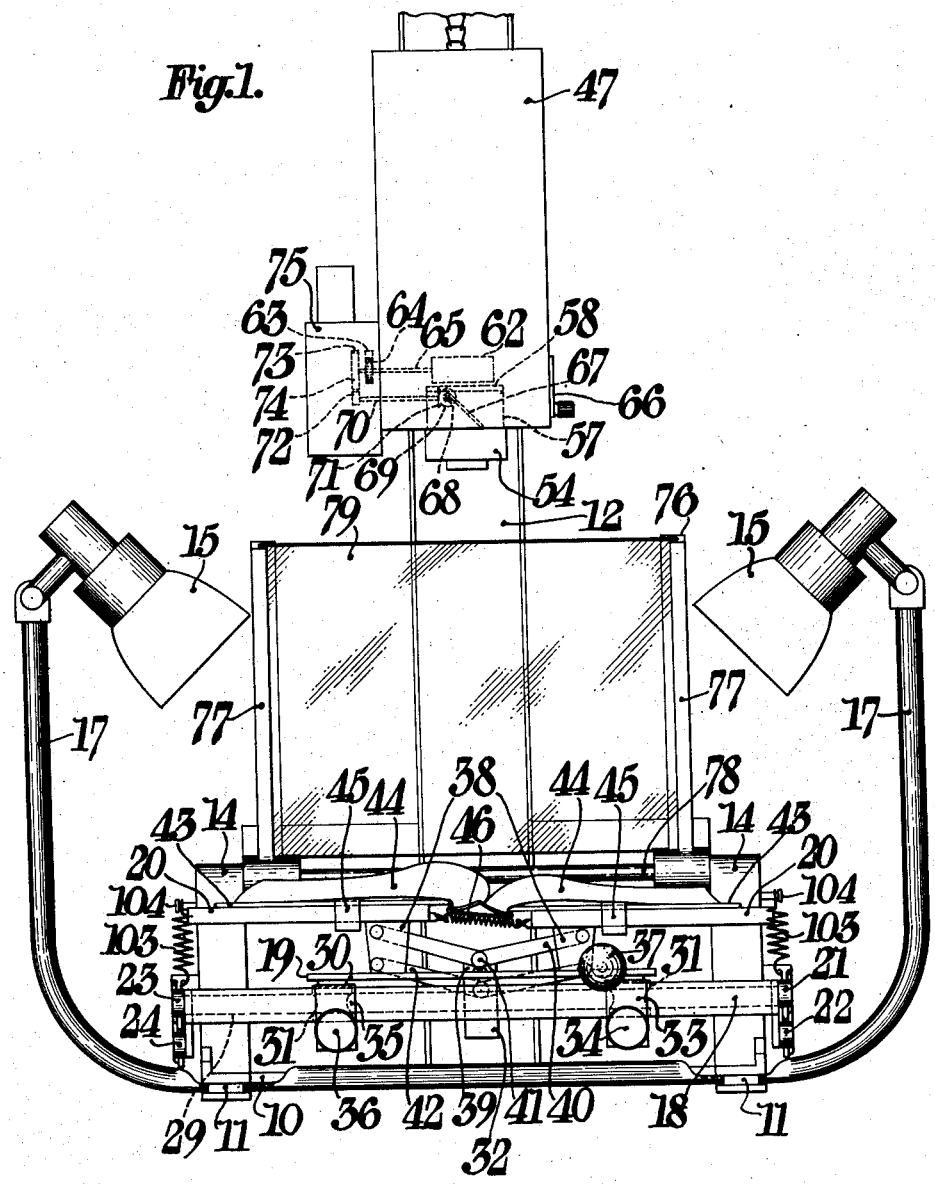

Dec. 19, 1939.  R. S. HOPKINS  2,184,012
PHOTOGRAPHIC REPRODUCING MACHINE AND COPY HOLDER THEREFOR
Filed Oct. 23, 1936   3 Sheets-Sheet 3

Roy S. Hopkins,
INVENTOR
BY
ATTORNEYS.

Patented Dec. 19, 1939

2,184,012

UNITED STATES PATENT OFFICE 2,184,012

PHOTOGRAPHIC REPRODUCING MACHINE AND COPY HOLDER THEREFOR

Roy S. Hopkins, Rochester, N. Y., assignor to Eastman Kodak Company, Rochester, N. Y., a corporation of New Jersey Application October 23, 1936, Serial No. 107,250

12 Claims. (Cl. 88—24)

The present invention relates to a photographic reproducing machine and, more particularly, to the copy holder for supporting the subject matter to be reproduced.

It is well known that subject matter to be copied may be pressed against a platen member to flatten said subject matter within the focal plane of the objective on the copying camera. It is also common practice to provide a tendency means for urging the subject matter on the copy holder against such a platen member.

The primary object of the present invention is the provision of a brake means applied to the supporting assembly which is under the influence of a tendency means and for preventing movement of said supporting assembly when the platen member is raised.

Another object of the invention is the provision of a supporting assembly including a slidable carriage which may be moved to present different portions of the subject matter to the copying camera.

A further object of the present invention is the provision of an actuating means for moving the platen member and including a linkage which assumes a straight line position against an abutment when the platen member is in operative position and when the supporting assembly is urged against said platen member by the tendency means.

Still another object of the invention is the provision in the aforementioned actuating means of a connection which permits over travel of a reciprocating member in said means to operate the shutter of the copying camera.

Other and further objects of the invention will be suggested to those skilled in the art by the disclosure herein.

The aforementioned objects of this invention are obtained in a photographic reproducing machine which comprises a camera, a supporting assembly for the subject matter to be copied, a platen member operated by an actuating means and against which said subject matter may be pressed, and a brake means applied to said supporting assembly for overcoming the tendency means and released when the said platen member is in operative position to permit the tendency means to move the subject matter against the platen member.

Figure 2:
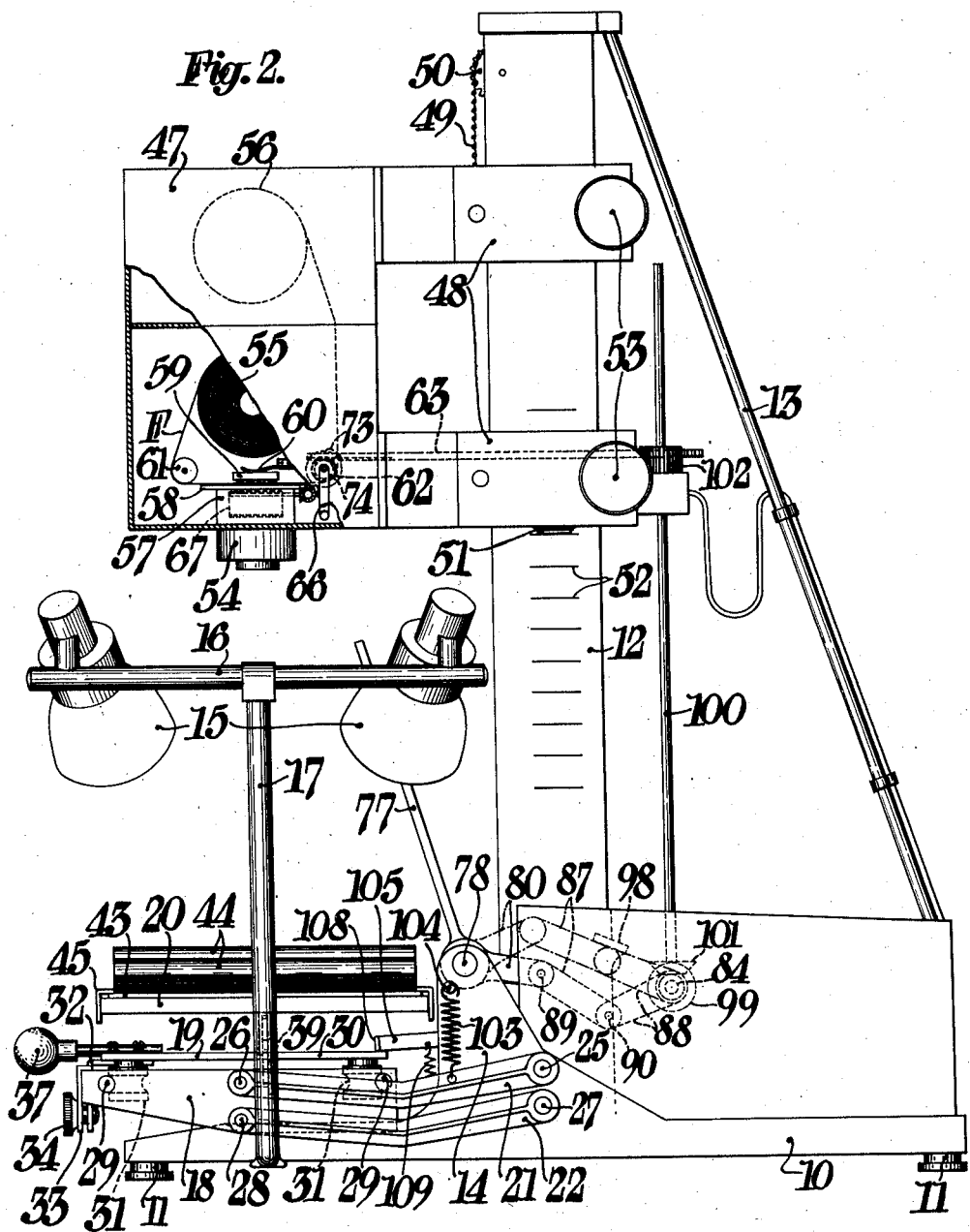
Figures 3, 4:
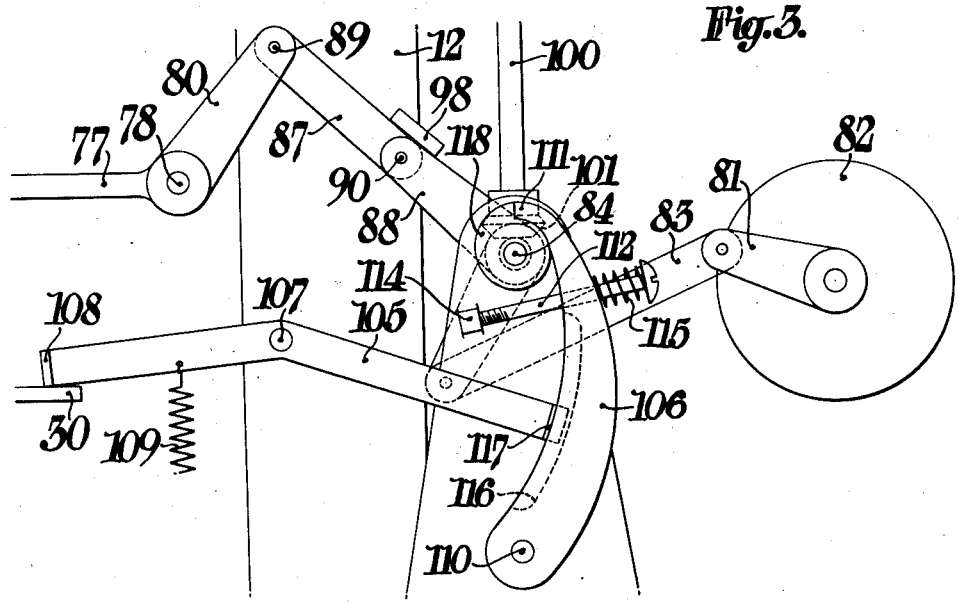

Reference is hereby made to the accompanying drawings wherein like reference characters designate similar elements and wherein:

Fig. 1 is a front elevation of a photographic reproducing machine according to the invention, Fig. 2 is a side elevation of said photographic reproducing machine, Fig. 3 is a fragmentary side elevation of the brake means and actuating means according to the invention, Fig. 4 is a fragmentary perspective illustrating the brake shoe of the brake means and the connection of the actuating means which permits over travel thereof.

Although the copy holder of the invention is to be described in connection with a photographic reproducing machine, it is obvious that such copy holder may be devoted to other uses and my invention is not confined to the use herein shown.

The photographic reproducing machine is mounted upon a base member 10 which has a plurality of feet 11, a vertical column 12 to which is connected a guy rod 13, and a pair of supports 14. A plurality of illuminating members 15 are pivotally mounted upon cross bars 16 which are in turn connected to pipes 17 fastened to the base member 10.

The supporting assembly, according to the invention, comprises a supporting frame 18, a supporting carriage 19, plates 20 for supporting the subject matter to be copied, and operative connections between said plates 20 and the supporting carriage 19. Said supporting frame 18 may be rectangular in form and is operatively connected to the base member 10 by means of two pairs of links 21, 22 and 23, 24. The link 21 is fastened at one end to the base member 10 by a stud 25 and at the other end to the supporting frame 18 by a pin 26, while the link 22 is fastened at one end to the base member 10 by a stud 27 and at the other end to the supporting frame 18 by a pin 28. Said studs 25 and 27 and said pins 26 and 28 are in vertical spaced relation relative to each other upon the respective base member 10 and supporting frame 18 so that a parallelogram linkage is provided between said base member 10 and said supporting frame 18. The other side of supporting frame 18 is connected in a similar manner by the pair of links 23 and 24 to said base member 10. A pair of rods 29 extend between the ends of supporting frame 18 to form a track for the supporting carriage 19 next to be described in detail.

Said supporting carriage includes a plate member 30 upon which is mounted a plurality of rollers 31 for engaging the rods 29 or tracks upon the supporting frame 18. An angle member 32 is centrally mounted upon plate member 30 and extends adjacent supporting frame 18. A clamp 33 is slidably mounted upon supporting frame 18 and may be fastened thereto by tightening a thumb screw 34 on said clamp 33. A similar clamp 35 and a thumb screw 36 are also provided upon the supporting frame 18 at the other side of said angle member 32. A handle 37 is secured to plate member 30 and facilitates movement of said supporting carriage 19.

Plate members 20 are operatively connected to said supporting carriage 19 by a plurality of parallelogram linkages. Supporting fins 38 extend downwardly from the respective plates 20 and a vertical support 39 is centrally mounted upon the plate member 30. A bell crank 40 is intermediately pivoted by a pin 41 to said vertical support 39 and is pivoted at each end to the respective supporting fins 38 upon the plates 20. A second bell crank 42 is also centrally pivoted upon vertical support 39 and is pivotally connected at each end to respective supporting fins 38. Said bell cranks 40 and 42, together with their respective pivotal connections to supporting fins 38 and vertical support 39, form a pair of compensating parallelogram linkages for each of the plates 20. The subject matter to be copied, such as a book comprising covers 43 and pages 44, is placed upon the plates 20. Each of the book covers 43 is fastened to each of the plates 20 by means of clamps 45 and a plurality of springs 46 extend between the adjacent edges of the plates 20 for the purpose of supporting the back of the book.

In view of the parallelogram linkages formed by bell cranks 40 and 42, as one plate member 20 is lowered, the other plate member 20 will be raised and said plate members 20 will be moved with their surfaces always in parallel relation to each other. If both pages 44 of the book are to be copied at the same time, the clamps 33 and 35 may be moved toward each other and against the angle member 32. When secured in these positions by the respective thumb screws 34 and 36, said clamps 33 and 35 prevent any movement of the laterally slidable supporting carriage 19. However, if it is desired to copy or photograph only one page of a book at a time, then said clamps 33 and 35 are adjustably positioned so that the opposite pages of the book will be centered with respect to the copying camera when said carriage is at its extreme positions. The handle 37 facilitates this reciprocating movement of the supporting carriage 19.

The copying camera 47 is slidably mounted upon the vertical column 12 by a pair of guide members 48. Said camera 47 and guide members 48 are counter-balanced through a chain 49, sprocket 50 and weight, not shown. An index member 51 is provided on one of the guide members 48 and may register with graduations 52 engraved in said vertical column 12. When the camera 47 is in the desired position thumb screws 53 on each of the guide members 48 may be tightened securely to fasten the camera in the adjusted position.

The copying camera 47 is provided with an objective 54, and includes a supply film roll 55 and a take-up film roll 56. A shutter housing 57 is provided within camera 47 and supports an aperture plate 58. A pressure pad 59 is resiliently urged toward aperture plate 58 by a spring member 60. The film "F" extends from the supply film roll 55, around an idler roll 61, through the film gate composed of aperture plate 58 and pressure pad 59, around a driving roll 62, and to the take-up film roll 56.

The driving roll 62 is rotated by a rack 63 slidably mounted upon one of the guide members 48 and reciprocated in a manner to be later described. Said rack 63 engages a rack pinion 64 which is mounted upon a shaft 65, also supporting said driving roll 62. A crank 66 is mounted upon one side of camera 47 and engages said driving roll 62 so that the same may be rotated manually and at will.

The exposure shutter 67 is mounted upon a shaft 68 journaled in a shutter housing 57 and carrying a miter gear 69. A shaft 70 is mounted within the camera 47 and carries a second miter gear 71 for meshing with the aforementioned miter gear 69. A trigger member 72 is mounted upon the other end of shaft 7 and is adapted to be actuated by a projection 73 upon a cam 74 which is mounted upon the end of shaft 65. Consequently, upon reciprocation of rack 63, the rack pinion 64 is rotated to move the film driving roll 62 and to rotate the cam 74 so that its projection 73 strikes trigger member 72 to rotate shaft 70 which in turn through miter gears 69 and 71 rotates the shaft 68 to move the exposure shutter and permit exposure of the film at the film gate. Said rack 63, trigger member 72 and cam 74 are enclosed within a housing 75 at the side of copying camera 47.

The platen member according to the invention is movably mounted upon the base member 10 and may comprise either a frame against which the subject matter to be copied is pressed or a glass plate against which the subject matter is pressed and flattened. In the illustrated embodiment of my invention, the platen member 76 comprises a pair of frame members 77 fastened to a shaft 78 which is journaled in the supports 14. Said frame members 77 may be provided with grooves to receive a glass plate 79. An arm 80 is integrally formed with one of the frame members 77, see Fig. 3.

An actuating means for said platen member 76 comprises a crank arm 81 which is rotated by a disk 82 or other suitable prime mover and which is pivotally connected to a link 83. A spindle 84, see Figure 4, is rotatably mounted in an auxiliary support 85 on base member 10 and carries an arm 86 which is pivotally connected to the other end of link 83. Obviously, upon rotation of crank arm 81, the spindle 84 is reciprocated. Said actuating means also includes a pair of levers 87 and 88. Lever 87 is pivotally connected at one end to arm 80 by pin 89 and at the other end to the lever 88 by a pin 90. Lever 88 has a bearing portion 91, see Fig. 4, which may rotate upon spindle 84 and which is provided with an angular notch 92. A stud 93 is fastened to spindle 84 and is located within said angular notch 92 of the bearing portion 91 on lever 88. A coil spring 94 encircles spindle 84, has one end anchored in a bushing 95 pinned to spindle 84 and has its other end 96 bearing against a pin 97 on lever 88.

An abutment 98 is mounted in position to engage levers 87 and 88 when they reach a straight line position and for this purpose may be conveniently attached to the vertical column 12. The levers 87 and 88 are timed so that they assume such straight line position in engagement with abutment 98 when the platen member 76 is in operative position or in the horizontal position of the frame member 77 illustrated in Fig. 3. When lever 88 strikes against abutment 98, it is prevented from rotating any farther. However, link 83 and arm 86 continue to move so that spindle 84 is rotated beyond the time when lever 88 strikes abutment 98. The reciprocating movement of spindle 84, as previously indicated, is transmitted to lever 88 by the end 96 of coil spring 94 through pin 97. The continued rotation of spindle 84 now merely moves stud 93 within the angular notch 92 without affecting the position of lever 88 which is maintained against abutment 98 by coil spring 94. This over travel of the reciprocating spindle 84 is utilized to operate the shutter 67 of the copying camera 47 and to advance the film therein in a manner now to be described.

An operating connection is provided between said reciprocating spindle 84 and said shutter 67 of the camera. Such operating connection comprises a miter gear 99 on one end of spindle 84, an operating stem 100 carrying a miter gear 101 meshing with said miter gear 99 and a pinion member 102 meshing with the other end of rack 63. Said operating stem 100 is provided with a notch (not shown) for providing a slidable connection with pinion member 102, but such that operating stem 100 and pinion member 102 always rotate together. Thus, during the first portion of the cycle of the actuating means, rack 63 is moved through the operating connection formed by pinion member 102, operating stem 100 and miter gears 99 and 101 to rotate film roll 62 and cam 74. The projection 73 on cam 74 is located so that it does not strike the trigger member 72 on shaft 70 until after levers 87 and 88 of the actuating means have engaged abutment 98 and until the over travel or movement of stud 93 in angular notch 92 has occurred. At this time the drive to film driving roll 62 is interrupted in a manner well known to the prior art and not material to the present invention so that it is not illustrated herein. Since trigger member 72 is not operated until the last part of the cycle of the actuating means, the shutter member 67 is not actuated to expose the film at the film gate until the last part of the operating cycle.

A tendency means is connected to the supporting frame 18 and for the purpose of urging the subject matter to be copied against the platen member. It is evident that in copying a book, for instance, the thickness of the subject matter between the supporting assembly and the platen member may vary and, therefore, it is essential to provide some means for always tending to move the upper surface of the subject matter against the platen. Such a tendency means may comprise spring members 103 connected at one end to base member 10 by pins 104 and connected at the other end to one of the links between the base member 10 and supporting frame 18, such as link 21 of the present disclosure.

Since such a tendency means constantly urges the supporting assembly upwardly, it is obvious that some restraint must be placed upon the supporting assembly when the platen member is raised or moved to in-operative position. For the purpose of restraining such a tendency means, a brake means may be supplied for engaging the supporting assembly and preventing movement thereof by the tendency means. However, this brake means must be released intermittently or in timed relation to the platen member so that the tendency means can move the supporting assembly when the platen member is in operative position.

Such a brake means may include a bell crank 105 and a brake shoe 106. The bell crank 105 is intermediately pivoted to vertical column 12 by pin 107, has an angular projection 108 on one end over the plate member 30 of supporting carriage 19 and is held against said plate member 30 by a coil spring 109. The brake shoe 106 is of arcuate formation, is pivoted at one end to the auxiliary support 85 by means of a pin 110 and has a nose 111 formed at the other end thereof. Said brake shoe 106 is normally maintained in engaging position by any suitable resilient means such as a bolt 112 threaded into a lug 114 upon auxiliary support 85, and encircled by a coil spring 115 which bears upon one edge of said brake shoe 106. The brake shoe 106 is provided in one edge with a slot 116 which is inwardly tapered to receive the tapered end 117 of a bell crank 105.

The release of said brake means is accomplished in timed relation to the operating cycle of the actuating means and may be performed by a single tooth cam 118 which is fastened to the end of spindle 84 adjacent auxiliary support 85. Said cam 118 is so positioned upon spindle 84 that brake shoe 106 is not disengaged from bell crank 105 until after levers 87 and 88 have assumed a straight line position against abutment 98 or until the platen member 76 has been moved to its horizontal operative position. Since the brake means is not released until after the platen member is in position for engagement by the subject matter upon the supporting assembly, there is no danger of the tendency means which operates the supporting assembly from continuing to move the supporting assembly after the platen member is raised.

The operation of the apparatus according to the present invention will be as follows. In the initial position, as illustrated in Figs. 1 and 2, the platen member is raised and the supporting assembly is being held by the brake means against movement under the influence of the tendency means. The cycle of operations is initiated by movement of the prime mover or disk 82 to cause reciprocation of spindle 84 and lever 88 through the coil spring 94. Movement of lever 88 causes lever 87 to operate arm 80 and bring the platen member 76 into operative position with its frame member 77 and glass plate 79 in horizontal position. As the platen member 76 attains this operative position, the levers 87 and 88 are in engagement with abutment 98 and are in straight line position. At this time, the single toothed cam 118 of the actuating means releases the brake shoe 106 so that bell crank 105 is disengaged and the tendency means consisting of spring members 103 may raise the supporting assembly so that the pages of the book are firmly pressed against the glass plate 79 of platen member 76. In this connection it is pointed out that the parallelogram linkages formed by links 21, 22 and 23, 24 insure that the upper surface of the supporting assembly and the subject matter thereon will be maintained in parallel relation. Continuing the cycle of the actuating means, the spindle 84 rotates to move stud 93 within angular notch 92 and this over travel causes the projection 73 on cam 74 to operate the trigger member 72 and exposure shutter 67. Then again, before levers 87 and 88 are moved away from abutment 98, the spindle 84 has returned in this reciprocating cycle to a position so that brake shoe 106 engages bell crank 105 to hold the supporting assembly against the action of the tendency means and before the platen member 76 is raised.

Various modifications of the invention are possible, but any such modifications which come within the scope of the appended claims are deemed to be within the spirit of my invention.

Having now particularly described my invention what I desire to secure by Letters Patent of the United States and what I claim is:

1. In a copy holder, the combination with a base member for supporting said copy holder, a supporting assembly operatively connected to said base member and for supporting a volume to be copied, a platen member on said base member, and a tendency means connected to said supporting assembly and for moving the volume thereon toward said platen member, said supporting assembly being spaced from said platen member at a distance depending on the thickness of said volume, of a brake means on said base member, directly engaging said supporting assembly in any spaced position thereof and for preventing movement of the same by said tendency means.

2. In a copy holder, the combination with a base member, a supporting assembly operatively connected to said base member and for supporting subject matter to be copied, a platen member on said base member, including a frame and a glass plate, and movable to and from an operative position, and a tendency means connected to said supporting assembly and for moving the same to press said subject matter thereon against the glass plate of said platen member, of a brake means on said base member for engaging said supporting assembly to prevent movement thereof by said tendency means, and an actuating means connected to said platen member and for moving the same to said operative position and for releasing said brake means only when said platen member is in said operative position.

3. In a copy holder, the combination with a base member, a supporting assembly operatively connected to said base member and for supporting subject matter to be copied, a platen member on said base member, and a resilient means connected to said supporting assembly and for moving the same toward said platen member, of a brake arm mounted on said base member for engaging said supporting assembly and movable therewith to positions corresponding to the position of said supporting assembly, and a brake shoe for normally engaging said brake arm in any of said positions to hold said supporting assembly in such position against the action of said resilient means.

4. In a copy holder, the combination with a base member, a supporting assembly operatively connected to said base member and for supporting subject matter to be copied, a platen member on said base member, and a resilient means connected to said supporting assembly and for moving the same toward said platen member, of a brake arm intermediately pivoted on said base member and having one end for engaging said supporting assembly, an arcuate brake shoe pivotally mounted on said base member and for engaging the other end of said brake arm, and a spring member for moving said brake shoe into engagement with said brake arm.

5. In a copy holder, the combination with a base member for supporting said copy holder, a supporting assembly operatively connected to said base member and for supporting subject matter to be copied, a platen member on said base member and movable to and from an operative position, and a tendency means connected to said supporting assembly and for moving the same toward said platen member, of a brake means on said base member for engaging said supporting assembly to prevent movement thereof by said tendency means, and an actuating means for moving said platen member to said operative position and for releasing said brake means only when said platen member is in said operative position.

6. In a copy holder, the combination with a base member for supporting said copy holder, a supporting assembly operatively connected to said base member and for supporting subject matter to be copied, a platen member on said base member and movable to and from an operative position, and a tendency means connected to said supporting assembly and for moving the same toward said platen member, of a brake means on said base member normally engaged and for engaging said supporting assembly to prevent movement thereof by said tendency means, and an actuating means for moving said platen member to operative position and including a part movable in timed relation for releasing said brake means only when said platen member is in said operative position.

7. In a copy holder, the combination with a base member, a supporting assembly operatively connected to said base member and for supporting subject matter to be copied, a platen member rotatably mounted on said base member and rotatable to and from an operative position, and a tendency means connected to said supporting assembly and for continuously urging the same toward said platen member, of an actuating means for moving said platen member to operative position and including an oscillating arm and a lever connected between said arm and said platen member which arm and lever are in extended straight line relation only when said platen member is in operative position.

8. In a copy holder, the combination with a base member, a supporting assembly operatively connected to said base member and for supporting subject matter to be copied, a platen member on said base member and movable to and from an operative position, and a tendency means connected to said supporting assembly and for continuously urging the same toward said platen member, of an actuating means for moving said platen member to operative position, including a reciprocating member and including a pair of levers pivotally connected between said reciprocating member and said platen member, and an abutment on said base member and located to abut said levers when said levers are in straight line position.

9. In a copy holder, the combination with a base member, a supporting assembly operatively connected to said base member and for supporting subject matter to be copied, a platen member on said base member and movable to and from an operative position, and a tendency means connected to said supporting assembly and for continuously urging the same toward said platen member, of an actuating means for moving said platen member to operative position, including a reciprocating member and including a pair of levers pivotally connected between said reciprocating member and said platen member, and an abutment on said base member and located to abut said levers when said levers are in straight line position, said reciprocating member being so timed with respect to said platen member that the same is in operative position when said lever arms are in straight line position and abutting against said abutment.

10. In a copy holder, the combination with a base member, a supporting assembly operatively connected to said base member and for supporting subject matter to be copied, a platen member on said base member and movable to and from an operative position, and a tendency means connected to said supporting assembly and for continuously urging the same toward said platen member, of a brake means including a brake arm for engaging said supporting assembly and including a brake shoe for engaging said brake arm to hold said supporting assembly against movement by said tendency means, and an actuating means for moving said platen member to operative position including a reciprocating member, a pair of levers pivotally connected between said reciprocating member and said platen member, and a part on said reciprocating member for moving said brake shoe to disengage the same from said brake arm, said part being arranged to accomplish such disengagement of said brake shoe and arm only when the platen member is in operative position and said levers are in straight line relation.

11. In a copy holder, the combination with a base member, a supporting assembly operatively connected to said base member and for supporting subject matter to be copied, a platen member on said base member, movable to and from an operative position and having an arm, and a means connected to said supporting assembly and for moving the same and the subject matter thereon respectively toward and against said platen member, of a reciprocating means including a spindle and a pin thereon, a pair of hinged links, one end of one link being connected to the arm of said platen member and one end of the other link being journaled on said spindle and provided with a slotted sector in which the pin on said spindle is located, and a coil spring encircling said spindle, having one end anchored to said spindle and its other end attached to said other link.

12. In a photographic copying machine, the combination with a base member, a supporting assembly operatively connected to said base member and for supporting subject matter to be copied, a platen member on said base member and movable to and from an operative position, a means for moving said supporting assembly and the subject matter thereon respectively toward and against said platen member, and a camera including a film gate, an objective for projecting to said film gate an image of said subject matter which is against said platen, and a shutter for intercepting the image projected toward said film gate, of a reciprocating means connected to said platen member for moving the same to operative position and including a connection permitting overtravel of said reciprocating means, an abutment for engaging said reciprocating means when said platen member is in operative position and preventing movement of said platen member during said overtravel of the reciprocating means, and an operating connection between said reciprocating member and the shutter of said camera and for opening said shutter only during the overtravel of said reciprocating member.

ROY S. HOPKINS.